(12) United States Patent
Saito

(10) Patent No.: US 8,269,991 B2
(45) Date of Patent: Sep. 18, 2012

(54) INFORMATION PROCESSING APPARATUS, METHOD AND STORAGE MEDIUM

(75) Inventor: Nobuhiro Saito, Kawasaki (JP)

(73) Assignee: Canon Kabushiki Kaisha, Tokyo (JP)

( * ) Notice: Subject to any disclaimer, the term of this patent is extended or adjusted under 35 U.S.C. 154(b) by 964 days.

(21) Appl. No.: 12/134,473

(22) Filed: Jun. 6, 2008

(65) Prior Publication Data
US 2008/0304095 A1 Dec. 11, 2008

(30) Foreign Application Priority Data
Jun. 7, 2007 (JP) ................... 2007-151424

(51) Int. Cl.
*G06F 3/12* (2006.01)
*G06F 11/00* (2006.01)
*G06K 15/00* (2006.01)

(52) U.S. Cl. ............... 358/1.13; 358/1.14; 358/1.16; 714/47.2; 714/47.3; 714/48

(58) Field of Classification Search .......... 358/1.13, 358/1.14, 1.16; 714/47.2, 47.3, 48
See application file for complete search history.

(56) References Cited

U.S. PATENT DOCUMENTS
5,581,242 A * 12/1996 Arita et al. ............ 340/691.6
2003/0105995 A1* 6/2003 Schroath et al. ............ 714/48

FOREIGN PATENT DOCUMENTS
| JP | 2000-293344 A | 10/2000 |
| JP | 2003-296255 A | 10/2003 |
| JP | 2005-31783 A | 2/2005 |
| JP | 2007-312107 A | 11/2007 |
| WO | WO 2006000110 A1 * | 1/2006 |

* cited by examiner

Primary Examiner — Thomas Lett
(74) Attorney, Agent, or Firm — Canon USA Inc. IP Division

(57) ABSTRACT

A printer monitoring apparatus includes a setting unit configured to set a display mode of a warning or an error related to a peripheral device, a determination unit configured to determine whether the warning or the error has previously occurred, a display unit configured to display the warning or the error in a case where the warning or the error has previously occurred, and a processing unit configured to continue a process or cancel a process according to the warning or the error based on whether the warning or the error has previously occurred.

4 Claims, 14 Drawing Sheets

FIG. 8

| STATUS MONITOR DISPLAY SETTING: VALID |
|---|
| STATUS MONITOR DISPLAY SETTING LEVEL : 0 × 00000011 |

FIG. 10

| TYPE OF DISPLAY DIALOG | DISPLAY CONTENT | SETTING VALUE |
|---|---|---|
| STATUS MONITOR MAIN WINDOW | SET DISPLAYING/ NON-DISPLAYING OF STATUS MONITOR MAIN WINDOW | 0×10000001 |
| STATUS MONITOR MESSAGE DIALOG | COVER OPEN DIALOG | 0×00000001 |
| | INK OUT ERROR DIALOG | 0×00000010 |
| | PAPER JAM ERROR DIALOG | 0×00000100 |
| | OTHER ERROR DIALOG | 0×00001000 |
| | WARNING AND GUIDE AS TO ERROR TO BE DETERMINED JUST BEFORE PRINTING (ALLOWING PROCEEDING TO PRINTING) | 0×00010000 |
| | WARNING AS TO ERROR TO BE DETERMINED JUST BEFORE PRINTING (DISABLING PROCEEDING TO PRINTING) | 0×00100000 |
| | DISPLAY ALL | 0×01000000 |

FIG. 11

| TYPE OF DISPLAY DIALOG | DISPLAY CONTENT | JOB HANDLING CONTENT |
|---|---|---|
| STATUS MONITOR MESSAGE DIALOG | COVER OPEN DIALOG | PROCEED TO PRINTING |
| | INK OUT ERROR DIALOG | CANCEL PRINTING |
| | PAPER JAM ERROR DIALOG | CANCEL PRINTING |
| | OTHER ERROR DIALOG | CANCEL PRINTING |
| | WARNING AND GUIDE AS TO ERROR TO BE DETERMINED JUST BEFORE PRINTING (ALLOWING PROCEEDING TO PRINTING) | PROCEED TO PRINTING |
| | WARNING AS TO ERROR TO BE DETERMINED JUST BEFORE PRINTING (DISABLING PROCEEDING TO PRINTING) | CANCEL PRINTING |

FIG. 12

| TYPE OF DISPLAY DIALOG | DISPLAY CONTENT | SETTING VALUE |
|---|---|---|
| STATUS MONITOR MESSAGE DIALOG | ERROR THAT REQUIRES REPAIRING | Level5 (HIGH) |
| | COVER OPEN DIALOG | |
| | INK OUT ERROR DIALOG | |
| | PAPER JAM ERROR DIALOG | Level4 |
| | UNAUTHORIZED CARTRIDGE LOADING WARNING | |
| | OTHER ERROR DIALOG | |
| | WARNING AND GUIDE AS TO ERROR TO BE DETERMINED JUST BEFORE PRINTING (ALLOWING PROCEEDING TO PRINTING) | Level3 |
| | OTHER ERROR DIALOG | |
| | WARNING AS TO ERROR TO BE DETERMINED JUST BEFORE PRINTING (DISABLING PROCEEDING TO PRINTING) | Level2 |
| | OPEN DIALOG | Level1 (LOW) |

FIG. 13

| TYPE OF DISPLAY DIALOG | DISPLAY CONTENT | SETTING VALUE |
|---|---|---|
| STATUS MONITOR MESSAGE DIALOG | PAPER OUT ERROR | PAPER-RELATED ERROR AND WARNING |
| | PAPER SIZE MISMATCH WARNING | |
| | PAPER JAM ERROR DIALOG | |
| | INK OUT ERROR DIALOG | INK-RELATED ERROR |
| | WASTE INK FULL ERROR | |
| | UNAUTHORIZED CARTRIDGE LOADING WARNING | |
| | COVER OPEN DIALOG | ERROR AND WARNING IN OTHER DEVICES |
| | OTHER ERROR A | |
| | OTHER ERROR B | |
| | OTHER WARNING A | |
| | OTHER WARNING B | WARNING ON DRIVER SETTING |

INFORMATION PROCESSING APPARATUS, METHOD AND STORAGE MEDIUM

BACKGROUND OF THE INVENTION

1. Field of the Invention

The present invention relates to a printer monitoring apparatus that monitors a printer, more specifically an abnormal status of a printer.

2. Description of the Related Art

Conventionally, there is a computer system where a computer monitors status of a printer to recognize abnormalities such as empty ink or out-of-paper conditions. Such a computer includes and executes a monitor program for monitoring the printer abnormality. The monitor program is stored in a memory and acquires the latest status of the printer at a predetermined interval of time. It then displays any abnormal status, such as an error occurring in the printer. In addition to the abnormal status of the printer, the monitor program can also display a warning about various print settings when printing is to be performed or display a warning about a printer setting status.

Moreover, there are cases where an operator wishes to avoid an unnecessary printer status to be displayed, or a printer status being redundantly displayed with the one on an application window. In such cases, as discussed in Japanese Patent Application Laid-Open No. 2000-293344, there is a method for allowing an operator to select a status or warning to be notified by a status monitor program. This can in turn prevent unnecessary notification.

However, according to Japanese Patent Application Laid-Open No. 2000-293344, when an operator sets an abnormal status of a device or a warning to a non-display mode, the printer may stop without printing a print job or without giving any explanation on the cause. As a result, the printer may be stopped in an error status even if another user wishes to print. Further, if a user tries to print from a personal computer (PC) in which a warning is issued, the user cannot proceed with printing because the previous job is stopped without being printed.

SUMMARY OF THE INVENTION

According to an aspect of the present invention, a printer monitoring apparatus includes a setting unit configured to set a display mode of a warning or an error related to a peripheral device, a determination unit configured to determine whether the warning or the error has previously occurred, a display unit configured to display the warning or the error in a case where the warning or the error has previously occurred, and a processing unit configured to continue a process or cancel a process according to the warning or the error based on whether the warning or the error has previously occurred.

According to another aspect of the present invention, a printer monitoring apparatus includes a setting unit configured to set a display mode of a peripheral device when a warning or an error occurs, and a processing unit configured to continue a process or cancel a process according to the display mode.

Further features and aspects of the present invention will become apparent from the following detailed description of exemplary embodiments with reference to the attached drawings.

BRIEF DESCRIPTION OF THE DRAWINGS

The accompanying drawings, which are incorporated in and constitute a part of the specification, illustrate exemplary embodiments, features, and aspects of the invention and, together with the description, serve to explain the principles of the invention.

FIG. 8 is an example of a file configuration for a status monitor display setting according to an exemplary embodiment of the present invention.

FIG. 10 illustrates an example of a display setting list of a status monitor according to an exemplary embodiment of the present invention.

FIG. 11 illustrates an example of a job handling list in a case where a non-display mode is set to a status monitor according to an exemplary embodiment of the present invention.

FIG. 12 illustrates an example of a display setting list of a status monitor according to an exemplary embodiment of the present invention.

FIG. 13 illustrates an example of a display setting list of a status monitor according to an exemplary embodiment of the present invention.

DETAILED DESCRIPTION OF THE EMBODIMENTS

Various exemplary embodiments, features, and aspects of the invention will be described in detail below with reference to the drawings.

First Exemplary Embodiment

Figure 1:
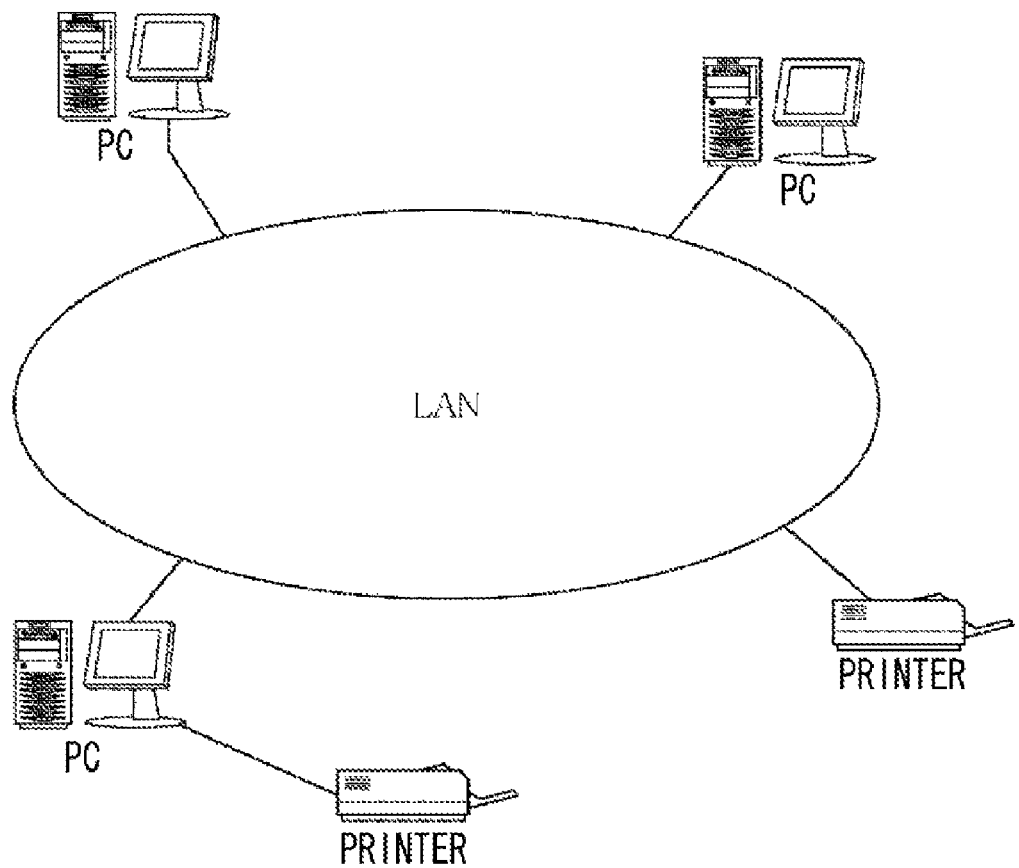
FIG. 1 is an example of a configuration of a printer connected to a PC according to an exemplary embodiment of the present invention.

FIG. 1 illustrates an example of an inkjet printer connected to a PC according to an exemplary embodiment of the present invention. The PC can be directly connected to the inkjet printer via an interface (I/F) such as a universal serial bus (USB), or via a server PC on a network to which the inkjet printer is connected. Further, the inkjet printer can be directly connected to a network and be accessed from a PC on the network.

Figure 2:
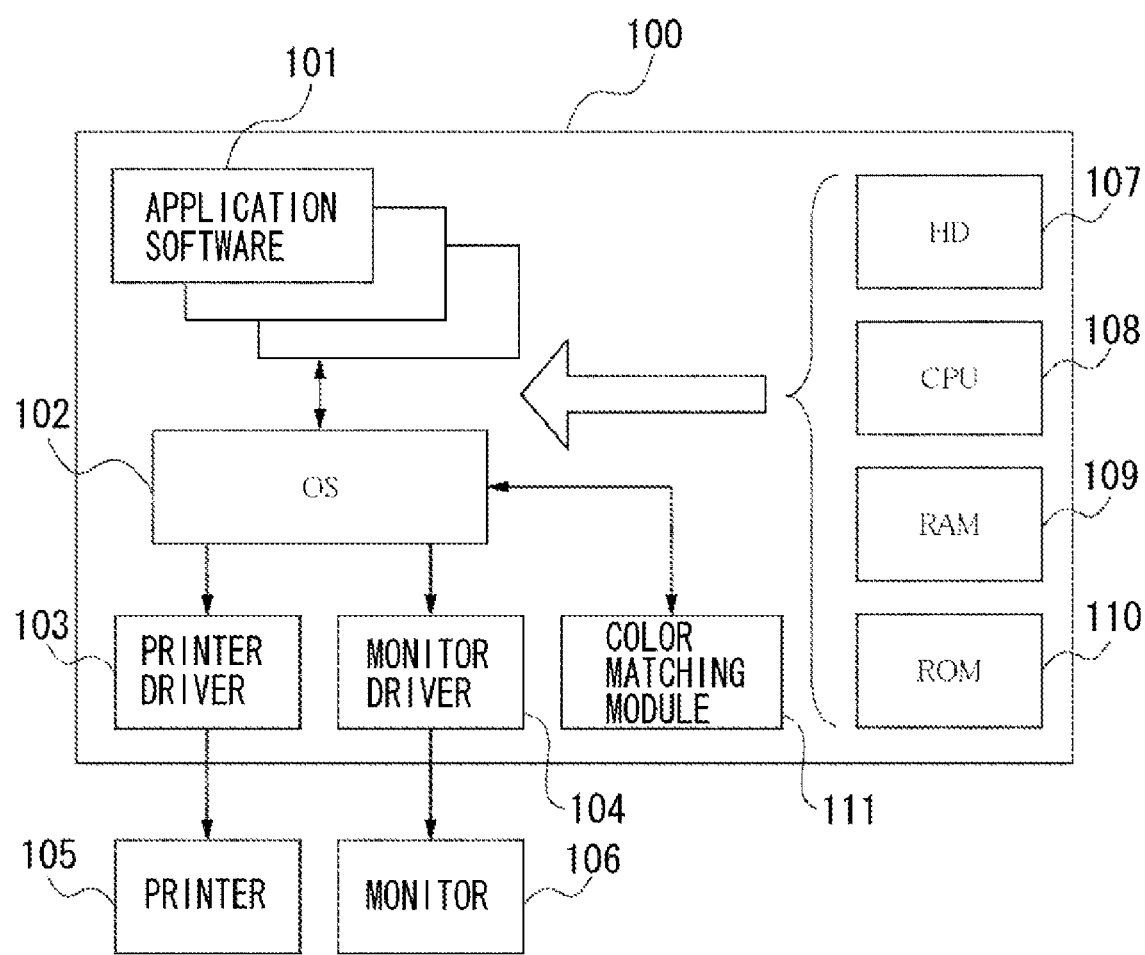
FIG. 2 is a block diagram illustrating an example of a configuration of a printer monitoring apparatus according to an exemplary embodiment of the present invention.

FIG. 2 illustrates a configuration of a host computer which is an example of an printer monitoring apparatus that creates print data to be sent to the above-described inkjet printer and displays an abnormal status of the printer and a warning.

A host computer 100 is connected to a printer 105, such as the above-described inkjet printer, and a monitor 106. The printer 105 is not limited to an inkjet printer and can be any printer, e.g., a laser beam printer.

The host computer 100 includes application software 101 such as a word processor, a spread sheet, or an Internet browser. The application software 101 issues a group of various rendering commands in which each rendering command indicates an output image (i.e., image rendering command, text rendering command, and graphics rendering command). The various rendering command group is input into a monitor driver 104 via an operating system (OS) 102. In a case where printing is to be performed, such a rendering command group is also input into a printer driver 103 via the OS 102. The printer driver 103 and the monitor driver 104 are software that process such a rendering command group and creates print data to be printed by the printer 105 or displayed by the monitor 106.

In the host computer 100, the above-described software is stored in a hard disk (HD) 107 or a read-only memory (ROM) 110, which is read out by a random access memory (RAM) 109, and executed by a central processing unit (CPU) 108. In the present embodiment, a PC is used as the host computer 100 and Microsoft® Windows as the OS 102 which are illustrated in FIG. 2. Further, an arbitrary application software which includes a printing function is installed in the above-described PC that is connected to the monitor 106 and the printer 105.

Further, in the host computer 100, the application software 101 creates output image data using text data classified as text, e.g. characters, graphics data classified as graphics e.g. figures, and image data classified as images, e.g. photographic images.

In a case where an image based on the output image data is to be printed, the application software 101 issues a print output request to the OS 102. That is, the application software 101 issues to the OS 102 a rendering command group which includes a text rendering command for rendering a text data portion, a graphics rendering command for rendering a graphics data portion, and an image rendering command for rendering an image data portion.

Upon receiving a print output request from the application software 101, the OS 102 sends the rendering command group to the printer driver 103. The printer driver 103 responds to the print output request and the rendering command group received from the OS 102, and creates print data that can be printed by the printer 105. The printer driver 103 then sends the created print data to the printer 105. The host computer 100 and the printer 105 are connected by an interface such as USB that realizes bi-directional communication. A color matching module 111 performs color matching between the monitor 106 and the printer 105.

Figure 3:
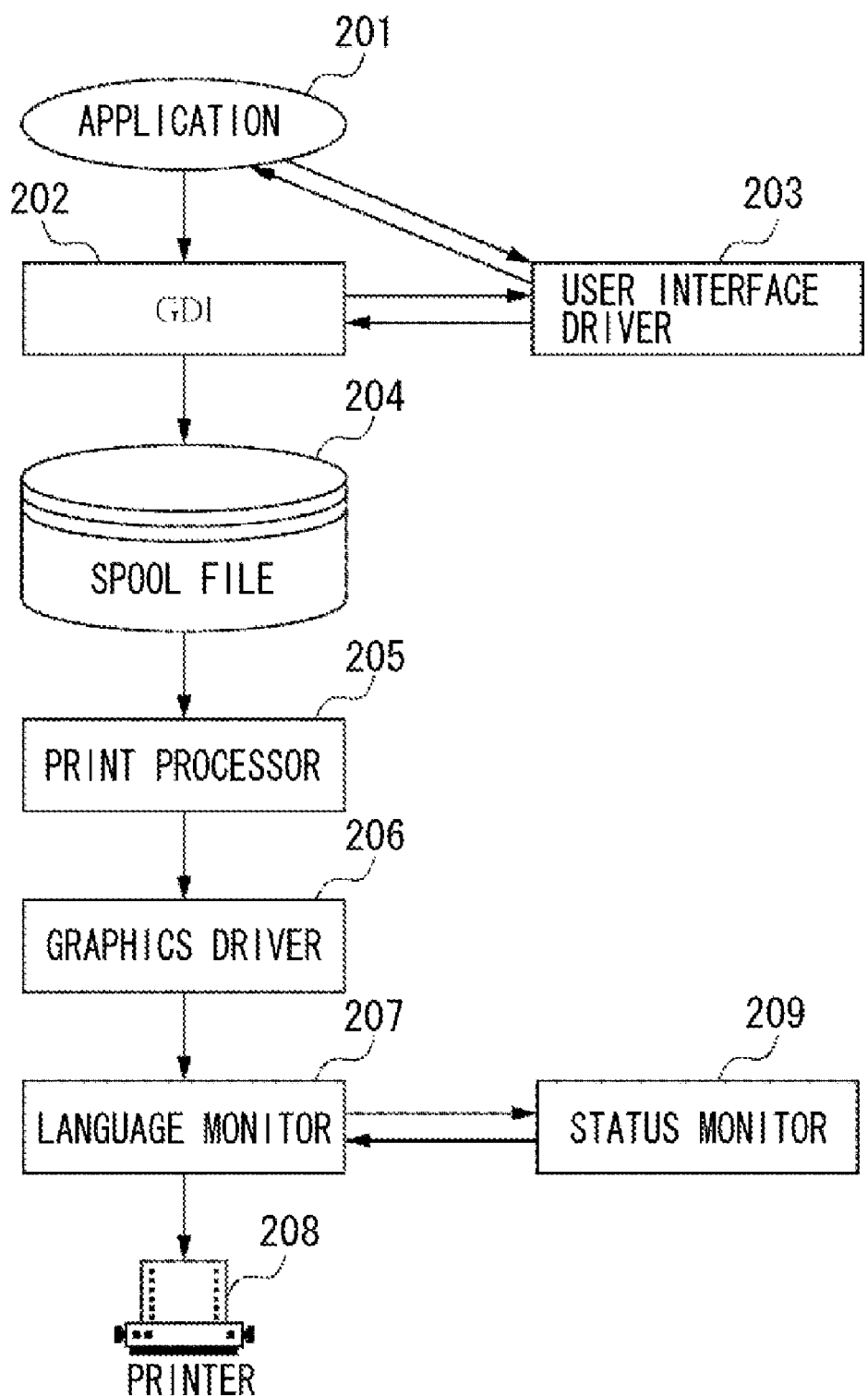
FIG. 3 illustrates a printer driver module and a process flow performed by the printer driver according to an exemplary embodiment of the present invention.

FIG. 3 is a block diagram illustrating a configuration of software (mainly a printer driver) in a print system according to an embodiment of the present invention.

Referring to FIG. 3, an application 201 creates a document and inquires a user interface driver 203 about the functions of the printer system in order to print the document. The application 201 then notifies the print system including a graphical device interface (GDI) 202 of print start. Upon receiving the notification of print start from the application 201, the GDI 202 notifies the user interface driver 203 of a print event, i.e., a print start by the application 201. The application 201 then supplies print data of the document to be printed to the GDI 202 and continues the printing process.

The print data is stored in a spool file 204 via the GDI 202. A print processor 205 reads out the print data from the spool file 204, and the print data is then sent to a language monitor 207 via a graphics driver 206.

The language monitor 207 sends the print data to a printer 208 while bi-directionally communicating with the printer 208. The language monitor 207 receives information about the status of the printer 208 as necessary and informs the status monitor 209 of the present status of the printer 208 or printing, based on information received from the printer 208 or on print data to be sent.

The status monitor 209 displays the statuses received from the language monitor 207 on the monitor 106. Additionally, in a case where printing is interrupted for some reason, the status monitor 209 displays options for dealing with the interruption to a user. The status monitor 209 then receives a response from the user about dealing with the interruption and sends the response to the language monitor 207.

The above-described software is stored in the HD 107 or the ROM 110, read out by the RAM 109, and executed by the CPU 108.

Figure 4:
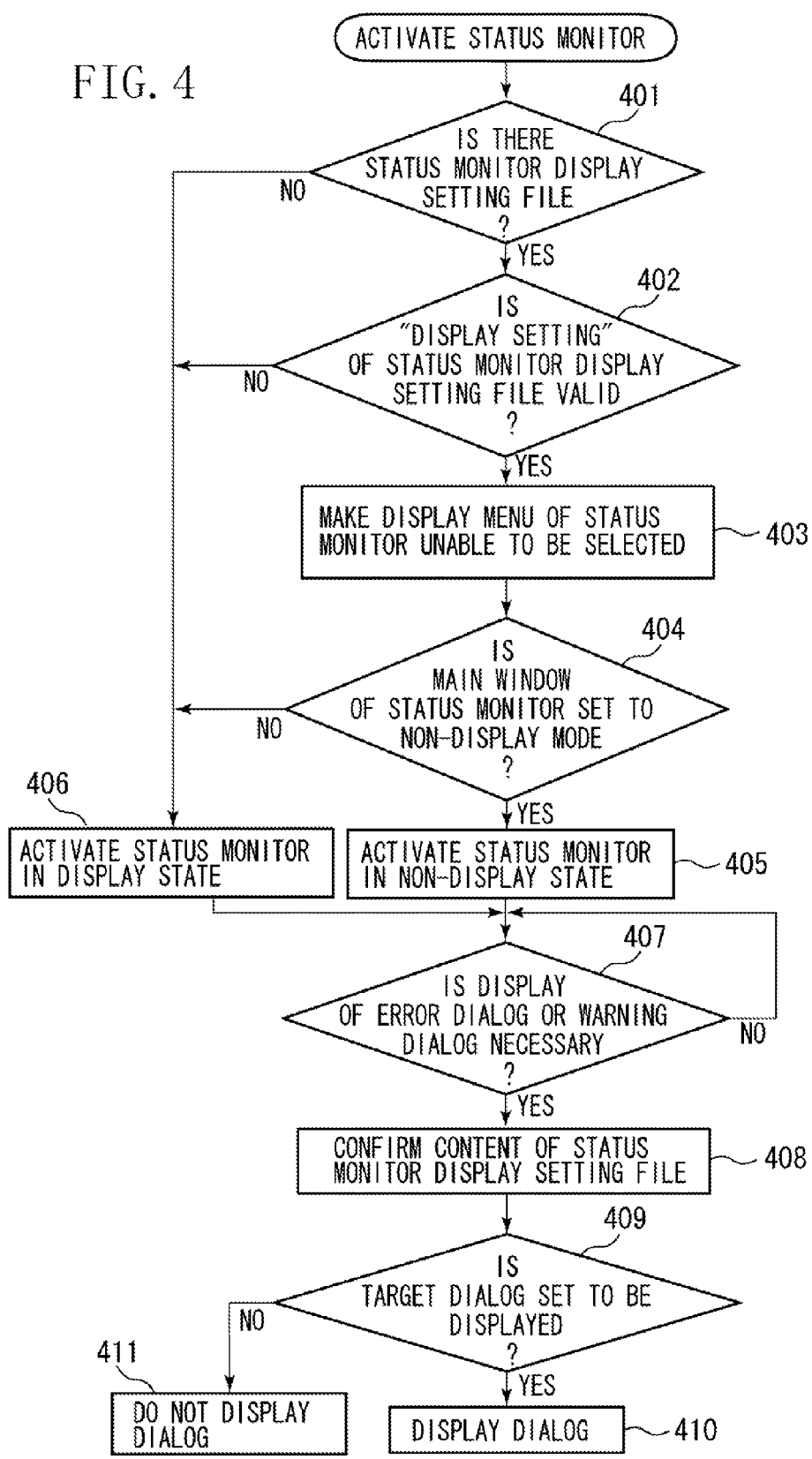
FIG. 4 is a flowchart illustrating a process performed by a status monitor according to an exemplary embodiment of the present invention.
Figure 5:
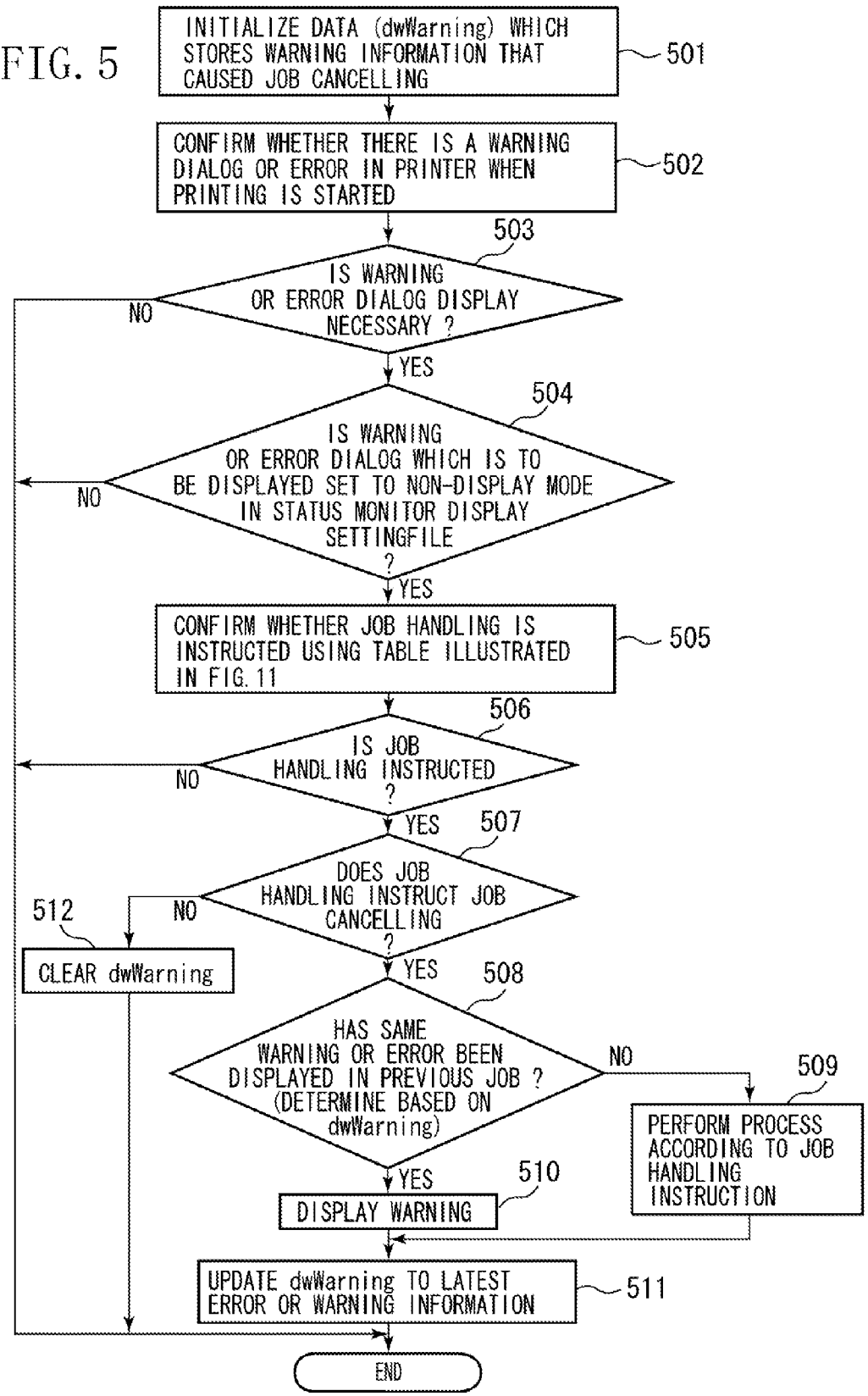
FIG. 5 is a flowchart illustrating a process performed by a status monitor according to an exemplary embodiment of the present invention.

FIGS. 4 and 5 are flowcharts illustrating processes performed by the status monitor 209 in the host computer 100 according to the present embodiment of the present invention.

Figure 6:
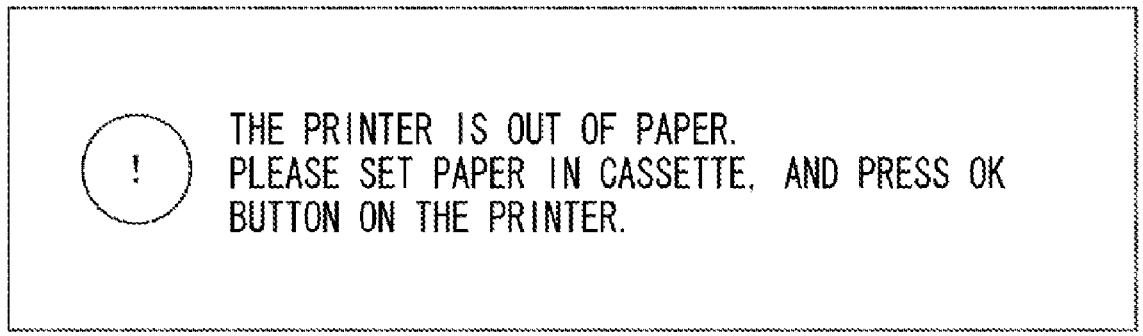
FIG. 6 illustrates an example of a status monitor user interface (UI) according to an exemplary embodiment of the present invention.
Figure 7:
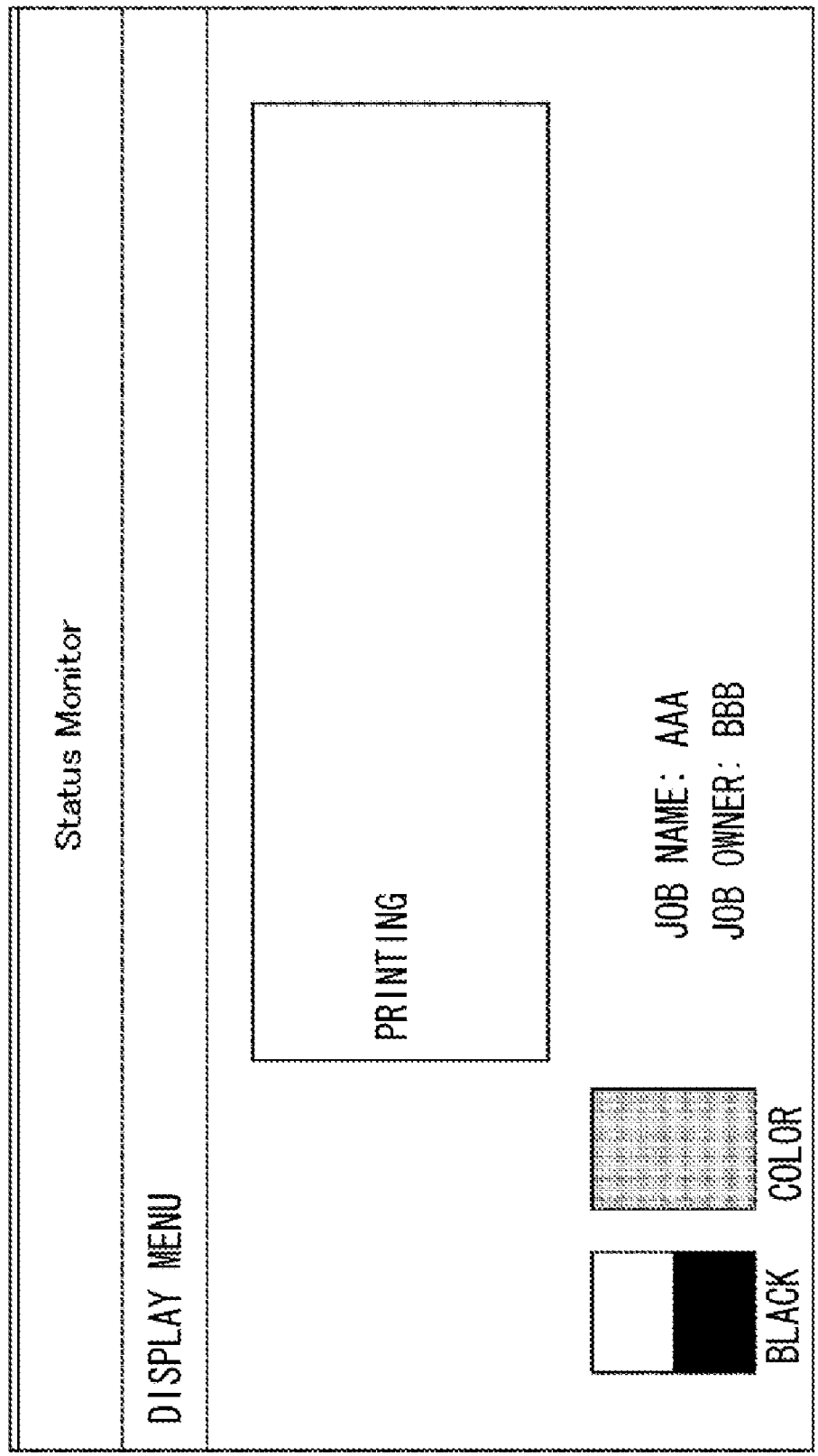
FIG. 7 illustrates an example of a status monitor UI according to an exemplary embodiment of the present invention.

The status monitor 209 displays UIs such as those illustrated in FIGS. 6 and 7. FIG. 7 illustrates a main window that is normally activated surely. The main window includes a display portion that displays a remaining amount of ink in an inkjet printer, a display portion that briefly displays a printer status, and information about the job being printed. FIG. 6 illustrates an error dialog which individually displays an error in a printer or a warning about a print setting in detail. For example, in a case where an error such as a paper out occurs during printing, the language monitor 207 illustrated in FIG. 3 acquires a printer status and notifies the status monitor 209 of the information. The status monitor 209 then displays an error dialog when the error has occurred. The error dialog gives a detailed guidance on content of the error and how to clear the error.

Further, when printing is started, the print data is transferred to the printer 208 via the language monitor 207. If the language monitor 207 searches content of the print data, or is in a state of issuing a warning based on print setting information and printer setting information when printing is started, the language monitor 207 temporarily stops print data transfer to the printer 208 and displays a warning dialog.

Figure 9:
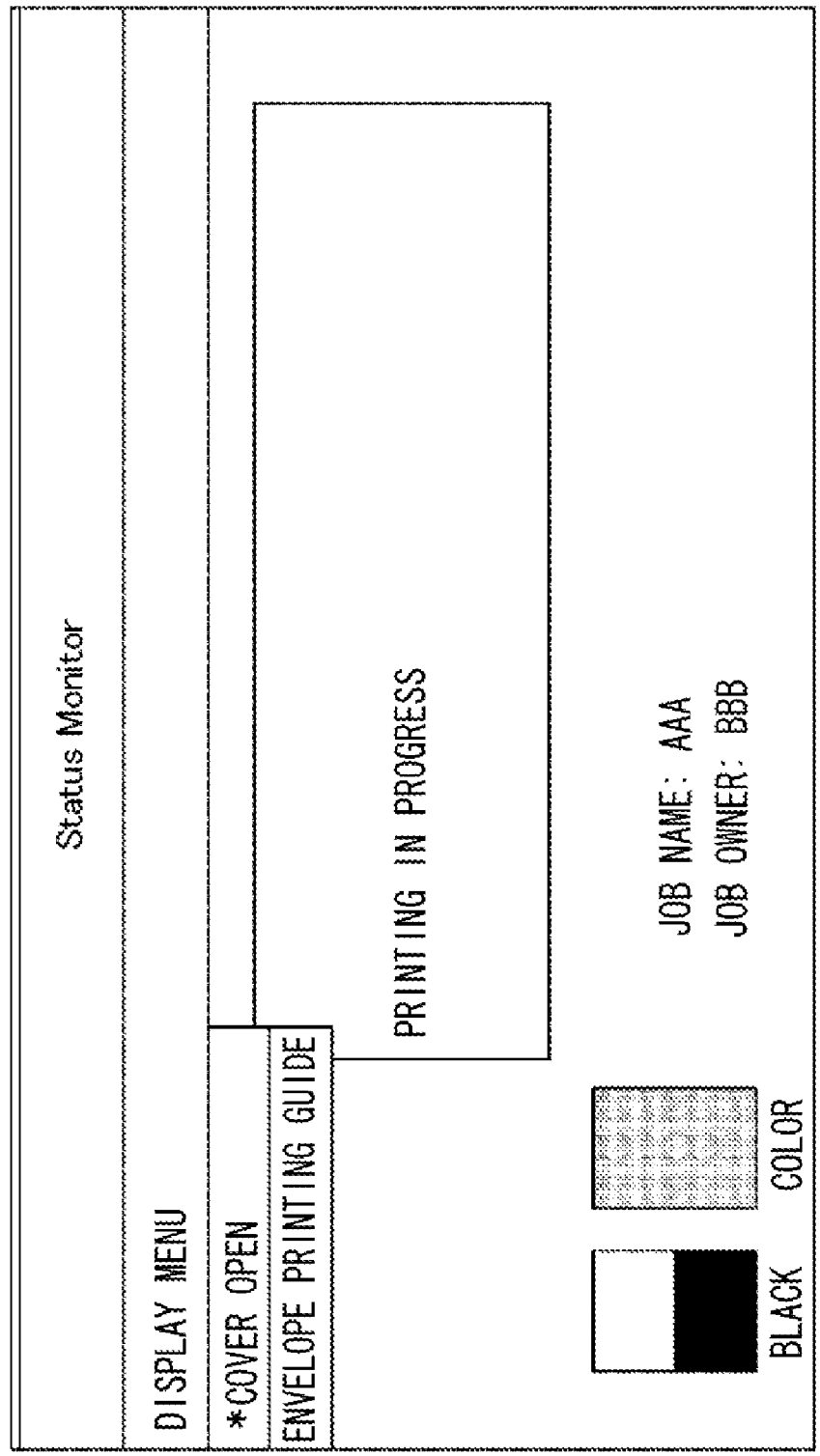
FIG. 9 is an example of a status monitor UI according to an exemplary embodiment of the present invention.

As illustrated in an example of a status monitor UI in FIG. 9, there is a simple UI in the status monitor 209 which allows a user to select notifying or not notifying a dialog depending on a type of status. When a user selects a "display menu" on the status monitor 209 illustrated in FIG. 9, "cover open" and "envelope printing guide" menus are displayed. In the example illustrated in FIG. 9, there is a * mark on "cover open". The * mark indicates that the status dialog of "cover open" will be displayed and notified, but a guide dialog of "envelop printing guide" will not be notified to the user.

A process performed by the status monitor 209 when printing is started will be described below with reference to the flowchart illustrated in FIG. 4.

Generally, the status monitor 209 is activated when printing is started. In step 401, the status monitor 209 determines whether there is a file for status monitor display setting. At this point, the status monitor 209 does not display a main window or an error dialog. In a case where there is no file for status monitor display setting (NO in step 401), the process proceeds to step 406. In step 406, the status monitor 209 displays a status monitor screen on the monitor 106 normally, and displays statuses of various printers.

The file for status monitor display setting can be a file that is structured as illustrated in FIG. 8. The file for status monitor display setting sets information that indicates whether a display setting is valid or invalid, and information that describes a level indicating whether a dialog about various statuses is set to a display mode or a non-display mode.

In the present embodiment, the file for status monitor display setting is previously set by a system administrator using a program for making a display setting to the status monitor 209. Thus, the file for status monitor display setting is separately managed from a display setting that can be set on the UI in the status monitor 209 illustrated in FIG. 9.

A method of creating the file for status monitor display setting illustrated in FIG. 8 will be described below. The present embodiment provides a setting list as illustrated in FIG. 10, so that a setting can be easily made by a system administrator who is not familiar with various types of errors and warnings that are displayed by the status monitor 209. The setting list illustrated in FIG. 10 provides setting values in a form of bit flags as to types of windows or error dialogs that are to be displayed by the status monitor 209. The system administrator then makes a setting using a program of an application programming interface (API) for creating the setting file illustrated in FIG. 8. For example, in a case where the system administrator desires to display only ink out error and a warning that printing cannot be continued, the setting values that correspond to such error and warning are combined as "0x00100010". The acquired combined setting value is then set to a parameter of the setting file creation API and executed.

Returning to the flowchart illustrated in FIG. 4, in step 402, the status monitor 209 determines whether the display setting that is set in the file for status monitor display setting illustrated in FIG. 8 is "valid". In a case where the display setting is set as "invalid" (NO in step 402), the process proceeds to step 406 in which the status monitor 209 displays normally. On the other hand, if the display setting of the file for status monitor display setting is set as "valid" (YES in step 402), the process proceeds to step 403. In step 403, the status monitor 209 causes the display setting menus of the various dialog display setting UIs in the status monitor 209 to be unselectable.

The UI illustrated in FIG. 9 can be set by a user of the status monitor 209. On the other hand, the file for status monitor display setting illustrated in FIG. 8 can be set by a system administrator using a display setting program. The setting file illustrated in FIG. 8 thus can be set by a system administrator other than a user of the status monitor 209. The setting file illustrated in FIG. 8 is stored in the RAM 109 and the HD 107.

Therefore, if a system administrator sets the file for status monitor display setting, the UI illustrated in FIG. 9 which a user can operate becomes non-operable, so that there is no inconsistency in the operation of the status monitor 209.

In step 404, the status monitor 209 determines whether the main window illustrated in FIG. 7 which is always displayed when the status monitor 209 is activated, is set to a non-display mode. The status monitor 209 makes the determination based on the level of the status monitor display setting in the setting file illustrated in FIG. 8. If the main window of the status monitor 209 is set to a display mode (NO in step 404), the process proceeds to step 406, and the status monitor 209 is activated in a display mode. On the other hand, if the main window is set to anon-display mode (YES in step 404), the process proceeds to step 405, and the status monitor 209 is activated in a non-displaying mode.

After performing the above-described process, the status monitor 209 monitors changes in the printer status.

In step 407, the status monitor 209 determines whether it is necessary to display a message that an error has occurred in the printer 208, or to display a warning based on a driver setting when printing is started. Normally, the status monitor 209 displays error information or content of a warning if an error has occurred in the printer 208, or if it is necessary to issue a warning when printing is started. However, in the present embodiment, the status monitor 209 confirms the content of the file for status monitor display setting in step 408.

In step 409, the status monitor 209 then determines whether the type of error or warning that is a display target is set to be displayed. In a case where the target error or warning is set to a non-display mode (NO in step 409), the process proceeds to step 411, and the status monitor 209 proceeds to perform the process without displaying the error or the warning. On the other hand, if the target error or warning is set to a display mode (YES in step 409), the process proceeds to step 410, and the status monitor 209 displays an error dialog or a warning dialog normally.

Note that the above description describes activation and display processing of various dialogs performed by the status monitor 209 when a display setting of the status monitor 209 is instructed.

A process performed by the status monitor 209 in a case where a target error dialog is set to a non-display mode in step 411 in the flowchart of FIG. 4 will be described below with reference to a flowchart illustrated in FIG. 5.

In step 501, when the status monitor 209 is activated, the status monitor 209 initializes an information value to be used in a determination process in the process flow illustrated in FIG. 5. That is, dwWarning, or a value to which a type of error or warning to be displayed by the status monitor 209 is input, is cleared in the initialization process.

In step 502, the status monitor 209 confirms whether there is a warning dialog or an error in a printer 208 when printing is started. In step 503, the status monitor 209 then determines whether it is necessary to display the warning or the error dialog. In a case where it is necessary to display the warning or the error dialog (YES in step 503), the process proceeds to step 504.

In step 504, the status monitor 209 determines whether the type of warning or error which needs to be displayed is set to a non-display mode in the file for status monitor display setting illustrated in FIG. 8. If the warning or error is set to a non-display mode (YES in step 504), the status monitor 209 does not display the warning or the error dialog, and the print job is not completed. The process is stopped without notifying a user why the print job is not completed. Further, even if another user wishes to make prints, the next job cannot be started when the job stopped by the error is not completed. The processing of a job in a case where the present job transfer is not completed will be described below.

FIG. 11 illustrates statuses in which a non-display mode can be set in the status monitor 209. The table illustrated in FIG. 11 defines job handling processes corresponding to such statuses in a case where a job transfer is stopped due to an error or a warning state.

For example, a warning as to an error which is to be determined just before printing belongs to a group of warnings having specifications in which the print data can be transferred to the printer and continued to be printed without much problem. Conventionally, when there is such a warning, print data transfer is stopped and a warning dialog is displayed. However, according to the present embodiment, the warning dialog is not displayed, so that the print data is transferred to the printer and printing is continued. Further, conventionally, print data transfer is stopped in a case where a guide dialog is to be displayed. On the contrary, the guide dialog is not displayed according to the present embodiment, so that print data transfer is continued. Further, if a warning (or an error)

indicates that it is impossible to continue printing, the print data transfer is stopped until the error is cleared in a conventional case. However, according to the present embodiment, the error dialog is not displayed, and the print job is cancelled. Such instructions are described in the job handling table illustrated in FIG. 11.

The job handling table illustrated in FIG. 11 is stored in the HD 107, and a user can edit the job handling table. The job handling processes corresponding to the display contents in the job handling table can be modified by a system administrator using a job handling process modification API, so that the job handling table can be freely customized.

Returning to the flowchart illustrated in FIG. 5, in step 505, the status monitor 209 confirms whether there is a job handling instruction corresponding to the warning or error in the table illustrated in FIG. 11. In step 506, the status monitor 209 determines whether a job handling is instructed. In a case where a job handling is instructed (YES in step 506), the status monitor 209 performs a process according to the content of the instructed job handling, e.g., continues printing or cancels printing.

In step 507, the status monitor 209 determines whether the instructed job handling process is to cancel printing. If the job handling instruction is to continue printing instead of canceling the printing (NO in step 507), the process proceeds to step 512, and the status monitor 209 clears the value dwWarning. On the other hand, if the job handling instruction is to cancel printing (YES in step 507), the process proceeds to step 508.

In step 508, the status monitor 209 determines whether there is a history of displaying the same warning or error in a previous (last) job. The determination is made based on the value dwWarning. If there is a history of displaying the same error or warning in the previous printing (YES in step 508), the process proceeds to step 510. In step 510, the status monitor 209 proceeds to notify the user that printing has failed due to the same printing error or print setting error, without canceling the job while ignoring a state that the status monitor 209 is set to a non-display mode. On the other hand, if there is no history of the same error or warning in the previous printing (NO in step 508), the process proceeds to step 509, and the status monitor 209 performs a process according to the job handling instruction. In step 511, the status monitor 209 updates the value dwWarning to the latest error or warning history.

Second Exemplary Embodiment

The flowchart illustrated in FIG. 4 of the first exemplary embodiment describes setting various errors and warnings in the status monitor 209 to a display mode or a non-display mode. In a case where a system administrator who makes such a setting is not familiar with the specifications of the printer and the printer driver, it is desirable to provide the administrator with an easier way of making a setting.

Consequently, according to a second exemplary embodiment, a management table which groups each error and warning into various levels as illustrated in FIG. 12 is provided for use by such a system administrator. Moreover, according to a second embodiment, a table as illustrated in FIG. 13 is provided in which errors and warnings are categorized. By using the above-described tables, a system administrator who is not familiar with the printer and the printer driver specifications can easily make settings as to errors and warnings.

Third Exemplary Embodiment

Figure 14:
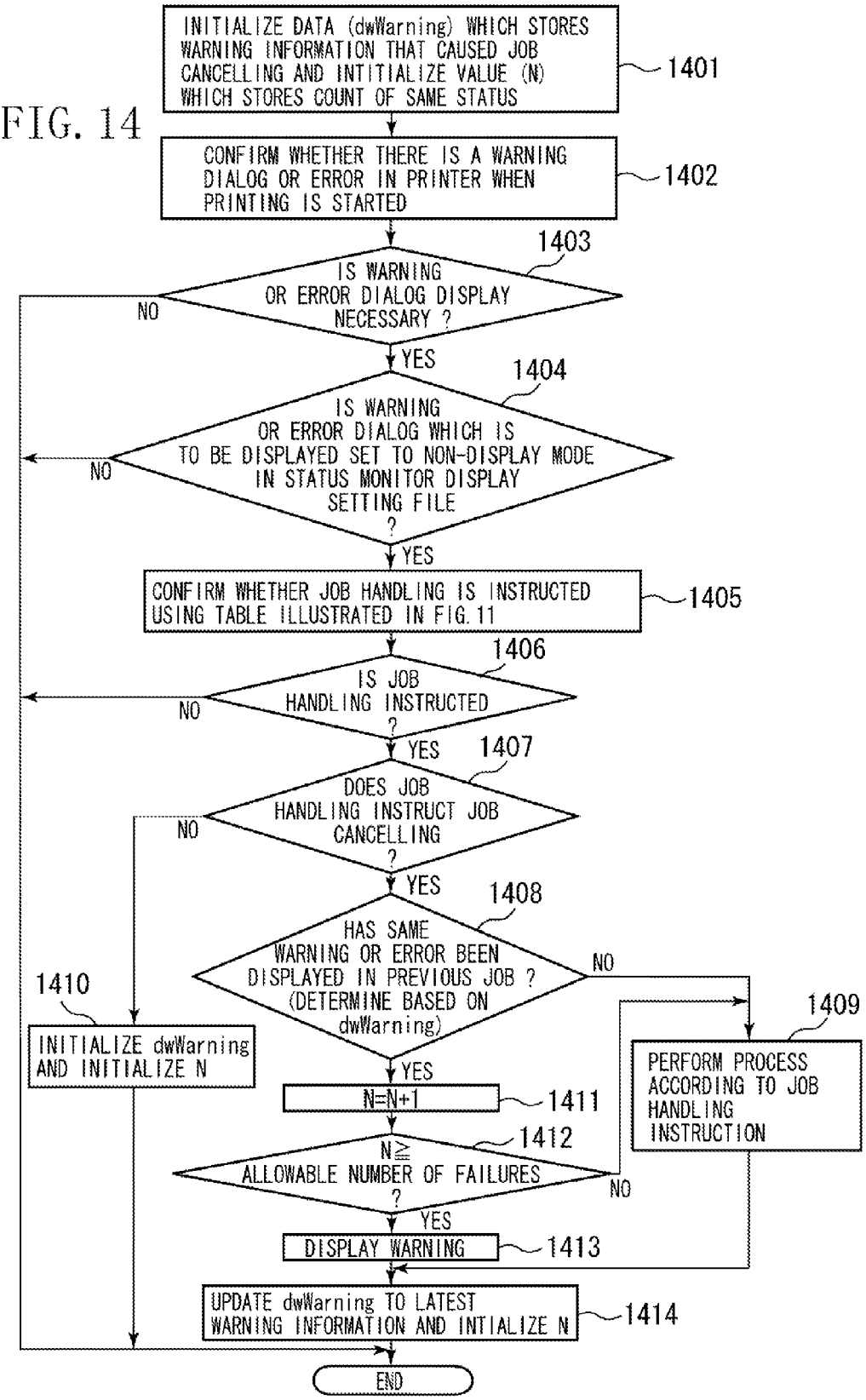
FIG. 14 is a flowchart illustrating a process performed by a status monitor according to an exemplary embodiment of the present invention.

The flowchart illustrated in FIG. 5 in the first exemplary embodiment describes an example of a process in which the status monitor 209 displays an error or a warning by ignoring the non-display setting of the status monitor 209 in a case where the same error or warning display status is repeated. A third exemplary embodiment describes a process of customizing an allowable number of cases where a same error or a warning display state may repeatedly occur. Such a process performed by the status monitor 209 is illustrated in a flowchart of FIG. 14.

In step 1401, the status monitor 209 initializes a data (i.e., dwWarning) which stores an error or warning information that has caused job canceling. In addition, the status monitor 209 initializes a value (N) which stores a count value acquired by counting the cases where the statuses are the same.

Steps 1402 to 1408 are similar to steps 502 to 508 described in the flowchart illustrated in FIG. 5, and further description about these steps are omitted. In step 1408, if it is determined that the same warning or error had occurred in the previous job (YES in step 1408), the process proceeds to step 1411 in which the status monitor 209 increments the count value N.

In step 1412, the status monitor 209 determines whether the count value N has become greater than or equal to a predetermined number (i.e., greater than or equal to an allowable number of failures). For example, if the allowable number of failures is defined as five times, and if a job is consecutively canceled five times due to the same cause (YES in step 1412), the process proceeds to step 1413. In step 1413, the status monitor 209 displays the error or the warning by ignoring the non-display setting. On the other hand, if the count value is less than the allowable number of failures (NO in step 1412), the process proceeds to step 1409, and the status monitor 209 then performs a process according to the job handling process.

In step 1414, the status monitor 209 updates the value dwWarning to new warning information and clears the count value N.

The exemplary embodiments of the present invention are described based on an example of a status monitor which displays a warning or an error in a printer. However, the present invention can be applied to a status monitor that displays a warning or an error related to a scanner and other peripheral devices.

As described above, according to an exemplary embodiment of the present invention, a job which cannot be printed due to an abnormal status or a warning that is set to a non-display state can be processed according to a job handling table.

Further, according to an exemplary embodiment of the present invention, it is determined whether a job handling process is repeatedly performed due to a same cause. In a case where the same job handling process is repeatedly performed due to the same cause, a trouble shooting guide can be displayed even if a non-display setting is made.

Further, in a computer that includes a printer monitoring function, printer abnormality and print setting warning display can be notified to a user according to the user request. Therefore, displaying of unnecessary notices can be decreased, and excellent usability can be achieved.

Further, according to an exemplary embodiment of the present invention, a notification which an operator does not need can be set to a non-display mode. As a result, a print job is prevented from stopping without any explanation and start of a next job is not hindered, or another user is not prevented from making prints.

Therefore, according to an exemplary embodiment of the present invention, printing is prevented from stopping due to a same error even in a case where a warning or an error is set to a non-display state.

Further, printing can be appropriately processed even in a case where a warning or an error is set to a non-display state.

Other Exemplary Embodiments

The present invention can also be achieved by providing a storage medium which stores software (program code) for implementing functions of the above-described exemplary embodiments, to a system or an apparatus. The program code stored in the storage medium can be read and executed by a computer (central processing unit (CPU) or micro-processing unit (MPU)) of the system or the apparatus.

In this case, the software (program code) itself realizes the functions of the above-described exemplary embodiments. The software (program code) itself and the storage medium which stores the software (program code) constitute the present invention.

The storage medium can be, for example, a floppy disk, a hard disk, a magneto-optical disk, a compact disc-read-only memory (CD-ROM), a CD-recordable (CD-R), a CD-rewritable (CD-RW), a digital versatile disc (DVD)-ROM, a DVD-RAM, a DVD-RW, a DVD+RW, a magnetic tape, a nonvolatile memory card, or a ROM. Further, such software (program code) can be downloaded via a network.

Furthermore, the above-described exemplary embodiments can be not only realized by executing software (program code) read by a CPU. An operating system (OS) or the like working on a computer can also perform a part or the whole of processes according to instructions of the software (program code) and realize functions of the above-described exemplary embodiments.

Furthermore, software (program code) read from a storage medium can be stored in a memory equipped in a function expansion board inserted in a computer or a function expansion unit connected to a computer, and a CPU in the function expansion board or the function expansion unit can execute all or a part of the processing based on the instructions of the software (program code) to realize the functions of the above-described exemplary embodiments.

While the present invention has been described with reference to exemplary embodiments, it is to be understood that the invention is not limited to the disclosed exemplary embodiments. The scope of the following claims is to be accorded the broadest interpretation so as to encompass all modifications, equivalent structures, and functions.

This application claims priority from Japanese Patent Application No. 2007-151424 filed Jun. 7, 2007, which is hereby incorporated by reference herein in its entirety.

What is claimed is:

1. An information processing apparatus, comprising:
 a processing unit configured to, when a warning needs to be displayed, perform a process without displaying the warning in a case where a warning target item is set to a non-display mode,
 wherein the processing unit ignores the non-display mode, displays the warning and updates the warning information in a case where an instruction for a printing cancel is issued to the warning target item, clears the warning information in a case where an instruction for a printing cancel is not issued to the warning target item, and performs the process without displaying the warning according to the non-display mode and updates the warning information in a case where an instruction for a printing cancel is not issued to the warning target item and there is no previous warning which is the same as the warning; and
 a display unit configured to, when the warning needs to be displayed, display the warning in a case where the warning target item is set to a display mode,
 wherein the processing unit, in a case where there is a previous warning which is the same as the warning, ignores the non-display mode, displays the warning and updates warning information, and in a case where there is no previous warning which is the same as the warning, performs the process without displaying the warning according to the non-display mode and updates the warning information.

2. The information processing apparatus according to claim 1, wherein the processing unit ignores the non-display mode, displays the warning and updates the warning information in a case where there is a previous warning which is the same as the warning and issued a predetermined number of successive times, and performs the process without displaying the warning according to the non-display mode and updates the warning information in cases where there is a previous warning which is the same as the warning and but not issued a predetermined number of successive times and where there is no previous warning which is the same as the warning.

3. An information processing method, comprising:
 performing a process, when a warning needs to be displayed, without displaying the warning in a case where a warning target item is set to a non-display mode,
 wherein the process ignores the non-display mode, displays the warning and updates the warning information in a case where an instruction for a printing cancel is issued to the warning target item, clears the warning information in a case where an instruction for a printing cancel is not issued to the warning target item, and performs the process without displaying the warning according to the non-display mode and updates the warning information in a case where an instruction for a printing cancel is not issued to the warning target item and there is no previous warning which is the same as the warning; and
 displaying, when the warning needs to be displayed, the warning in a case where the warning target item is set to a display mode,
 wherein the process, in a case where there is a previous warning which is the same as the warning, ignores the non-display mode, displays the warning and updates warning information, and in a case where there is no previous warning which is the same as the warning, performs the process without displaying the warning according to the non-display mode and updates the warning information.

4. A non-transitory computer-readable storage medium storing a computer-executable process, the computer-executable process causing a computer to perform an information processing method, comprising:
 performing a process, when a warning needs to be displayed, without displaying the warning in a case where a warning target item is set to a non-display mode,
 wherein the process ignores the non-display mode, displays the warning and updates the warning information in a case where an instruction for a printing cancel is issued to the warning target item, clears the warning information in a case where an instruction for a printing cancel is not issued to the warning target item, and performs the process without displaying the warning according to the non-display mode and updates the warning information in a case where an instruction for a printing cancel is not issued to the warning target item and there is no previous warning which is the same as the warning; and
 displaying, when the warning needs to be displayed, the warning in a case where the warning target item is set to a display mode, wherein the process, in a case where there is a previous warning which is the same as the warning, ignores the non-display mode, displays the warning and updates warning information, and in a case where there is no previous warning which is the same as the warning, performs the process without displaying the warning according to the non-display mode and updates the warning information.

* * * * *